(12) United States Patent
Potnis et al.

(10) Patent No.: US 12,084,063 B2
(45) Date of Patent: Sep. 10, 2024

(54) VEHICULAR CABIN MONITORING SYSTEM

(71) Applicant: MAGNA ELECTRONICS INC., Auburn Hills, MI (US)

(72) Inventors: Anuj S. Potnis, Hösbach (DE); Krishna Koravadi, Rochester Hills, MI (US); William J. Chundrlik, Jr., Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 88 days.

(21) Appl. No.: 18/171,446

(22) Filed: Feb. 20, 2023

(65) Prior Publication Data

US 2023/0205205 A1    Jun. 29, 2023

Related U.S. Application Data

(63) Continuation of application No. 17/447,451, filed on Sep. 13, 2021, now Pat. No. 11,586,204, which is a continuation of application No. 15/787,836, filed on Oct. 19, 2017, now Pat. No. 11,119,480.

(60) Provisional application No. 62/410,461, filed on Oct. 20, 2016.

(51) Int. Cl.
| | |
|---|---|
| *B60W 40/09* | (2012.01) |
| *B60W 30/182* | (2020.01) |
| *B60W 40/08* | (2012.01) |
| *B60W 50/00* | (2006.01) |
| *B60W 60/00* | (2020.01) |

(52) U.S. Cl.
CPC .......... *B60W 40/09* (2013.01); *B60W 30/182* (2013.01); *B60W 50/00* (2013.01); *B60W 60/0051* (2020.02); *B60W 60/0053* (2020.02); *B60W 60/0059* (2020.02); *B60W 2040/0818* (2013.01); *B60W 2040/0881* (2013.01); *B60W 2420/403* (2013.01); *B60W 2540/01* (2020.02); *B60W 2540/22* (2013.01); *B60W 2540/223* (2020.02); *B60W 2540/225* (2020.02); *B60W 2540/229* (2020.02); *B60W 2540/30* (2013.01); *B60W 2552/05* (2020.02); *B60W 2554/4029* (2020.02); *B60W 2555/20* (2020.02)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 9,766,625 B2 * | 9/2017 | Boroditsky ............. H04L 67/10 |

(Continued)

*Primary Examiner* — Todd Melton
(74) *Attorney, Agent, or Firm* — HONIGMAN LLP

(57) ABSTRACT

A vehicular cabin monitoring system includes an interior-viewing camera disposed at a vehicle and viewing a driver sitting at a driver seat of the vehicle and viewing at least one other seat of the vehicle. The interior-viewing camera is operable to capture image data. The vehicular cabin monitoring system, via processing of image data captured by the interior-viewing camera, detects an occupant present in the vehicle. The vehicular cabin monitoring system, via processing of image data captured by the interior-viewing camera, monitors the driver sitting at the driver seat of the vehicle. Control of the vehicle is adjusted based at least in part on the monitoring of the driver and the detected occupant.

82 Claims, 5 Drawing Sheets

(56) References Cited

U.S. PATENT DOCUMENTS

| | | | |
|---|---|---|---|
| 9,827,993 B2 | 11/2017 | Prokhorov | |
| 10,077,056 B1 | 9/2018 | Fields et al. | |
| 11,119,480 B2 | 9/2021 | Potnis et al. | |
| 11,292,476 B2 * | 4/2022 | Scofield | G08G 1/097 |
| 11,586,204 B2 | 2/2023 | Potnis et al. | |
| 2014/0336878 A1 | 11/2014 | Yanai et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0166069 A1 * | 6/2015 | Engelman | B60W 30/12 701/23 |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2017/0174221 A1 | 6/2017 | Vaughn et al. | |
| 2017/0277182 A1 | 9/2017 | May et al. | |
| 2017/0297587 A1 | 10/2017 | Mimura et al. | |
| 2017/0329331 A1 | 11/2017 | Gao | |
| 2018/0088574 A1 | 3/2018 | Latotzki et al. | |
| 2018/0203451 A1 | 7/2018 | Cronin et al. | |
| 2018/0259956 A1 | 9/2018 | Kawamoto | |

\* cited by examiner

VEHICULAR CABIN MONITORING SYSTEM

CROSS REFERENCE TO RELATED APPLICATIONS

The present application is a continuation of U.S. patent application Ser. No. 17/447,451, filed Sep. 13, 2021, now U.S. Pat. No. 11,586,204, which is a continuation of U.S. patent application Ser. No. 15/787,836, filed Oct. 19, 2017, now U.S. Pat. No. 11,119,480, which claims the filing benefits of U.S. provisional application Ser. No. 62/410,461, filed Oct. 20, 2016, which is hereby incorporated herein by reference in its entirety.

FIELD OF THE INVENTION

The present invention relates generally to driver assistance systems for vehicles and, more particularly, to a driver assistance system that utilizes one or more sensors or cameras at a vehicle.

BACKGROUND OF THE INVENTION

Use of imaging sensors in vehicle imaging systems and/or driver assistance systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vehicle control system that determines, identifies or classifies the type(s) of occupant(s) in the vehicle and adjusts a driving style of the vehicle (when operating in an autonomous or semi-autonomous mode) associated with the determination/identification/classification of occupant(s) in the vehicle. For example, if the system determines that an elderly person or a child or baby is present in the vehicle, the system may, when operating in an autonomous or semi-autonomous mode, control the vehicle in a less aggressive, more conservative manner. The system may learn different control characteristics by processing inputs when an individual is driving the vehicle (when the vehicle is not operating in an autonomous or semi-autonomous mode), such that the system may control the vehicle in a manner similar to that individual's preferences when it is determined that that individual is an occupant in the vehicle. The driving style or mode applied when the system is operating in an autonomous or semi-autonomous mode may also be responsive to other inputs, such as, for example, the geographical location of the vehicle, the current weather conditions at the vehicle, the time of day, and/or the like.

These and other objects, advantages, purposes and features of the present invention will become apparent upon review of the following specification in conjunction with the drawings.

LEGEND

10—Vehicle
12—Vision System
14a-d—Exterior viewing cameras
16—Display device
18—Electronic Control Unit
20—Interior rearview mirror
22—Interior monitoring system
100—Driver behavior learning algorithm
102—Vehicle behavior profile
104—Driver profile
106—Time of day information
108—Location information
110—Occupant type information
112—Vehicle data
114—Weather information
116—World model (surrounding environment information)
118—Similar inputs as during the learning phase
120—Learned behavior data base
121—Driving behavior selection
122—Vehicle control
200—Driver behavior learning state determination
202—Driver behavior leaning routine
204—Erratic driving determination
206—DBL off state
208—DBL stand by state
210—DBL active state
212—DBL non-learning state
214—DBL learning enabled state

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
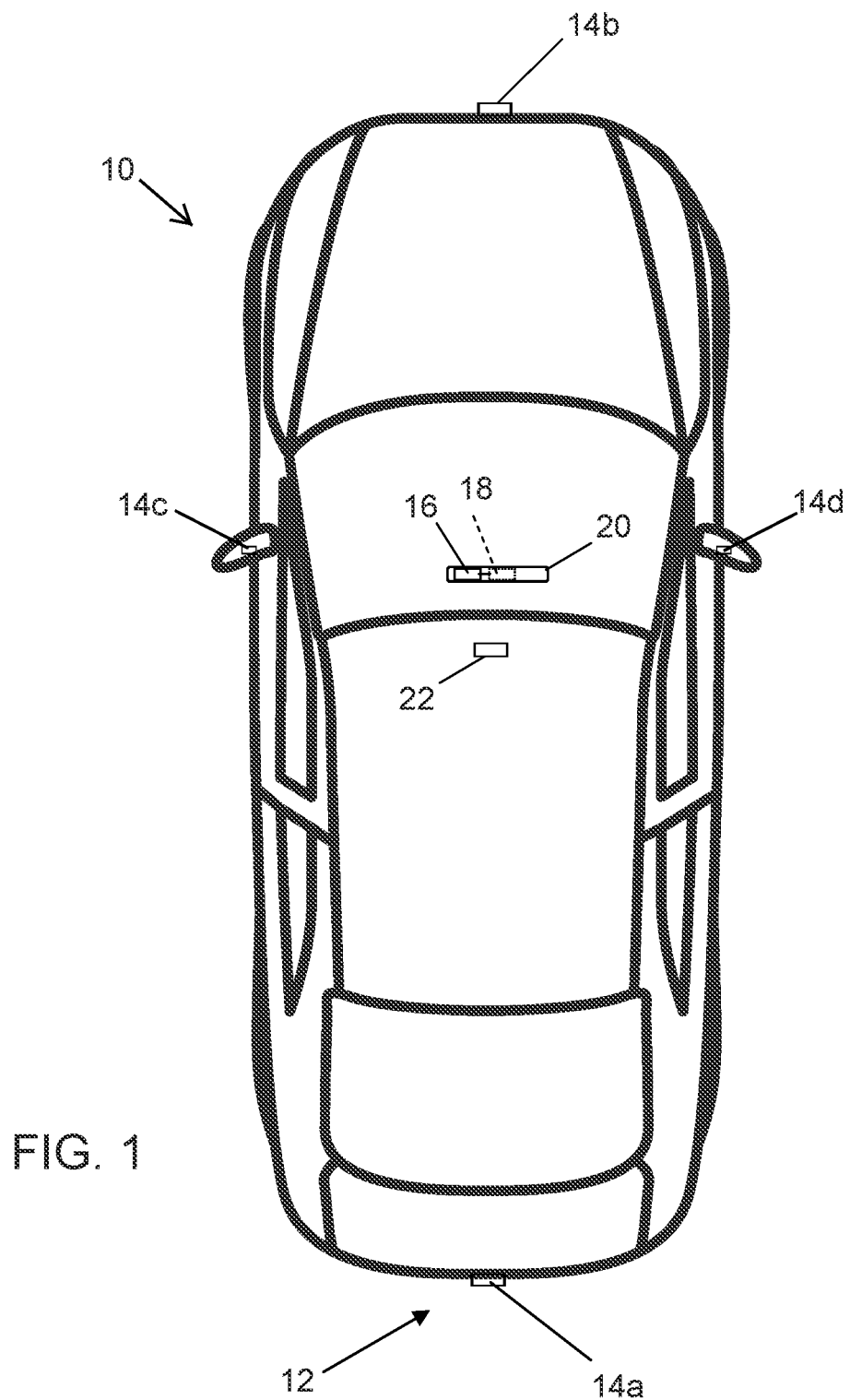
FIG. 1 is a plan view of a vehicle with a driver assistance system.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The system may also include an interior monitoring system 22 that may determine and/or identify and/or classify occupant(s) present in the vehicle.

Figure 2:
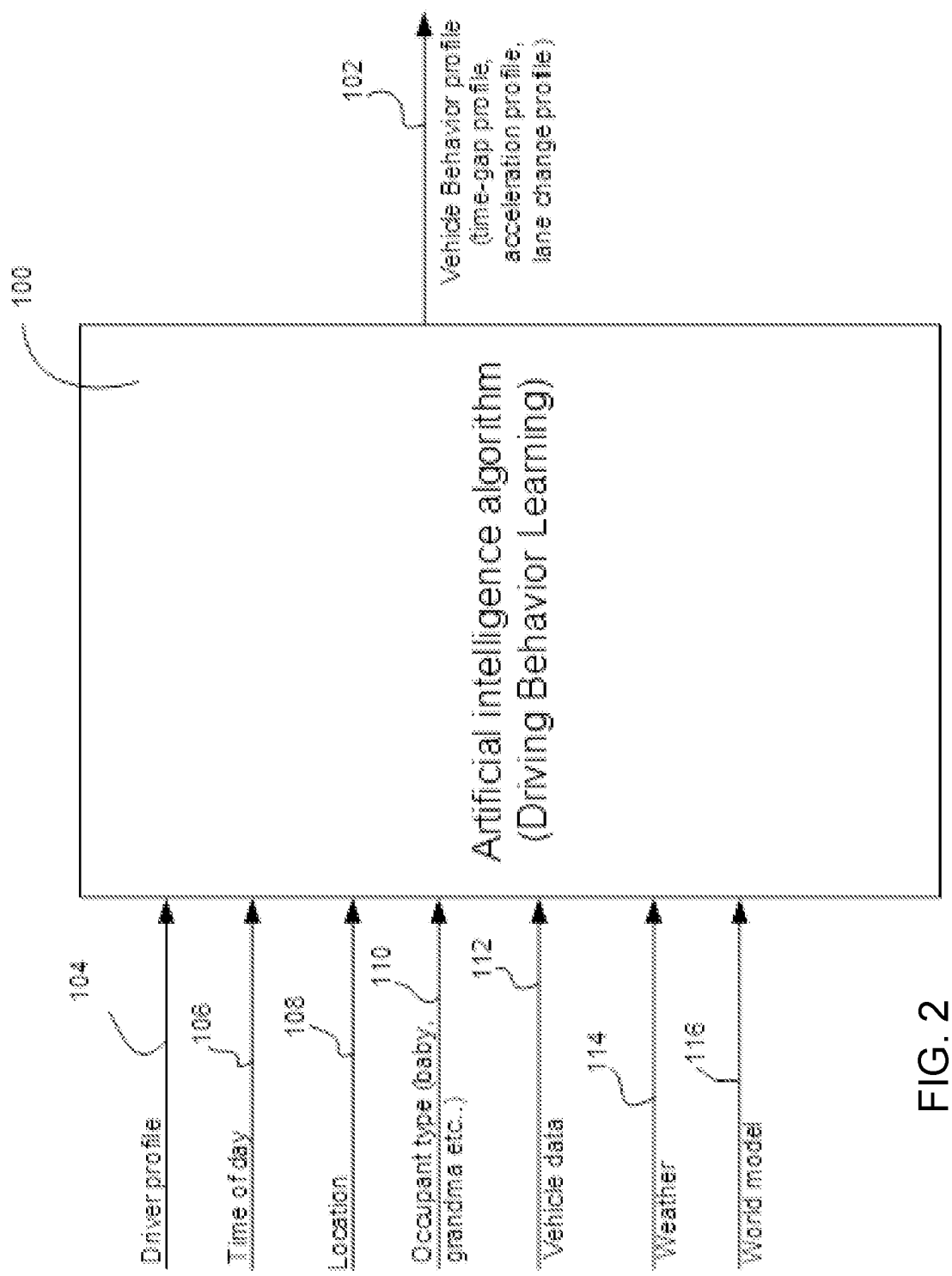
FIG. 2 is a block diagram showing the system learning process in accordance with the present invention.
Figure 3:
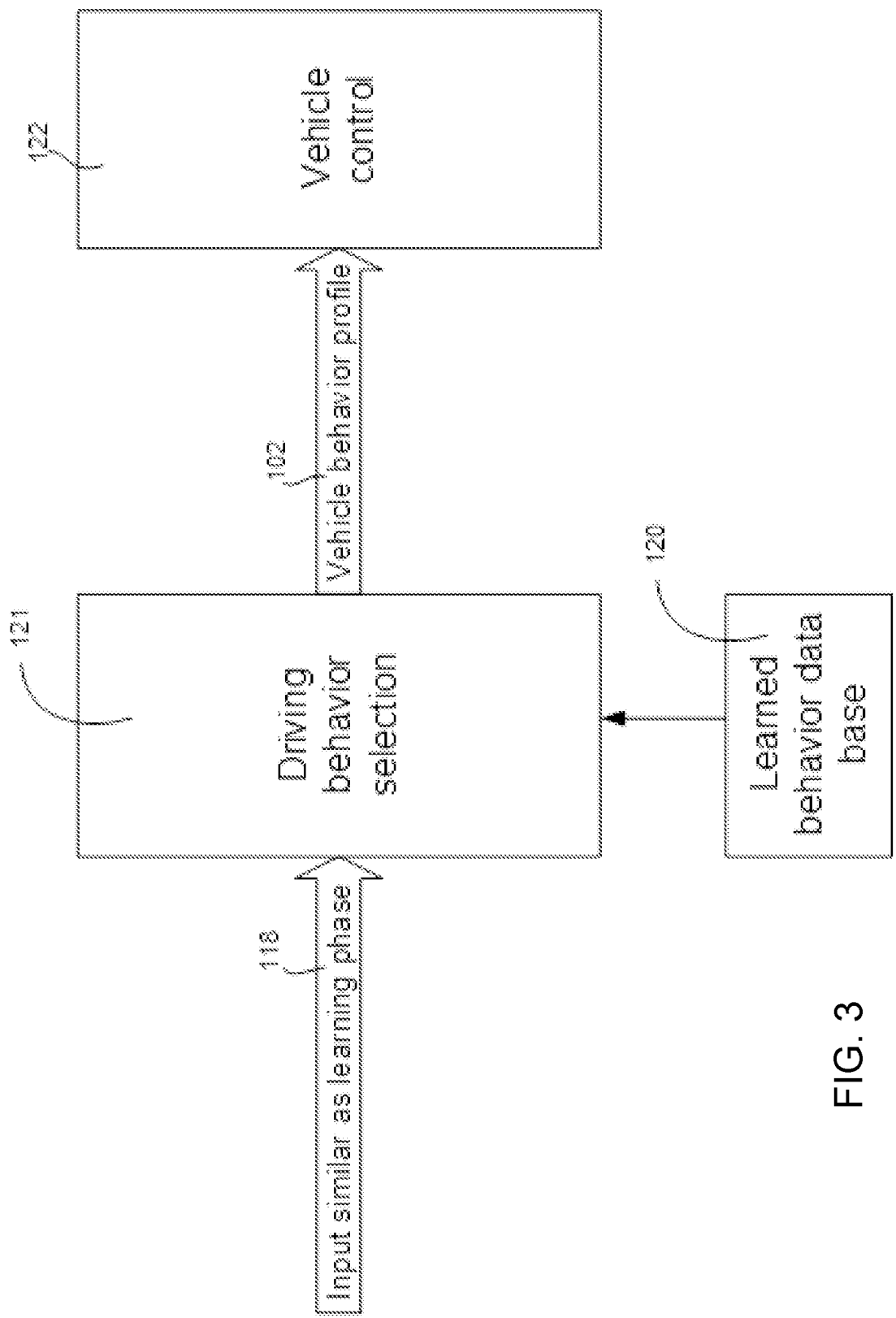
FIG. 3 is a block diagram showing the learning process applied to controlling the vehicle in accordance with the present invention.

The system of the present invention provides for learning of different driving style characteristics according to different circumstances. Every driver has a unique driving signature. A system with an artificial intelligence (AI) or machine learning algorithm may find use to firstly learn the driver's driving style upon certain conditions or parameters, see FIG. 2. The system may utilize or teach a machine learning algorithm in a supervised manner (adaptive learning) when the driver is controlling or maneuvering the vehicle and may replicate or imitate the driving style of that particular driver when the system is turned to an autonomous driving mode, see FIG. 3. As shown in FIG. 3, an input 118 is provided that is similar to a learning phase, and a learned behavior database 120 is also provided. The driving behavior selection 121 is responsive to the input and the database and generates a vehicle behavior profile 102, which includes various driving parameters pertaining to the learned driving style. The vehicle behavior profile 102 is provided to the vehicle control 122, which controls the vehicle according to the profile and learned driving style (such as when the vehicle control is operating in an autonomous driving mode).

The system may learn the driving behavior or style associated with the occupants (or characteristics of or types of occupants) present in the vehicle. There may be a certain driving condition without any occupants which may comply to a specific driving style or mode as well. That driving style or mode may be customized or may comprise a blend of modes which have been learned or trained when the vehicle has a driver. The system may additionally learn the driving behavior or style associated with condition parameters, such as time of day, date, season, location (including road type, lane, nation and town), weather, traffic conditions, legislative condition (eventually according road type and national law) and vehicle condition and/or the like.

Figure 4:
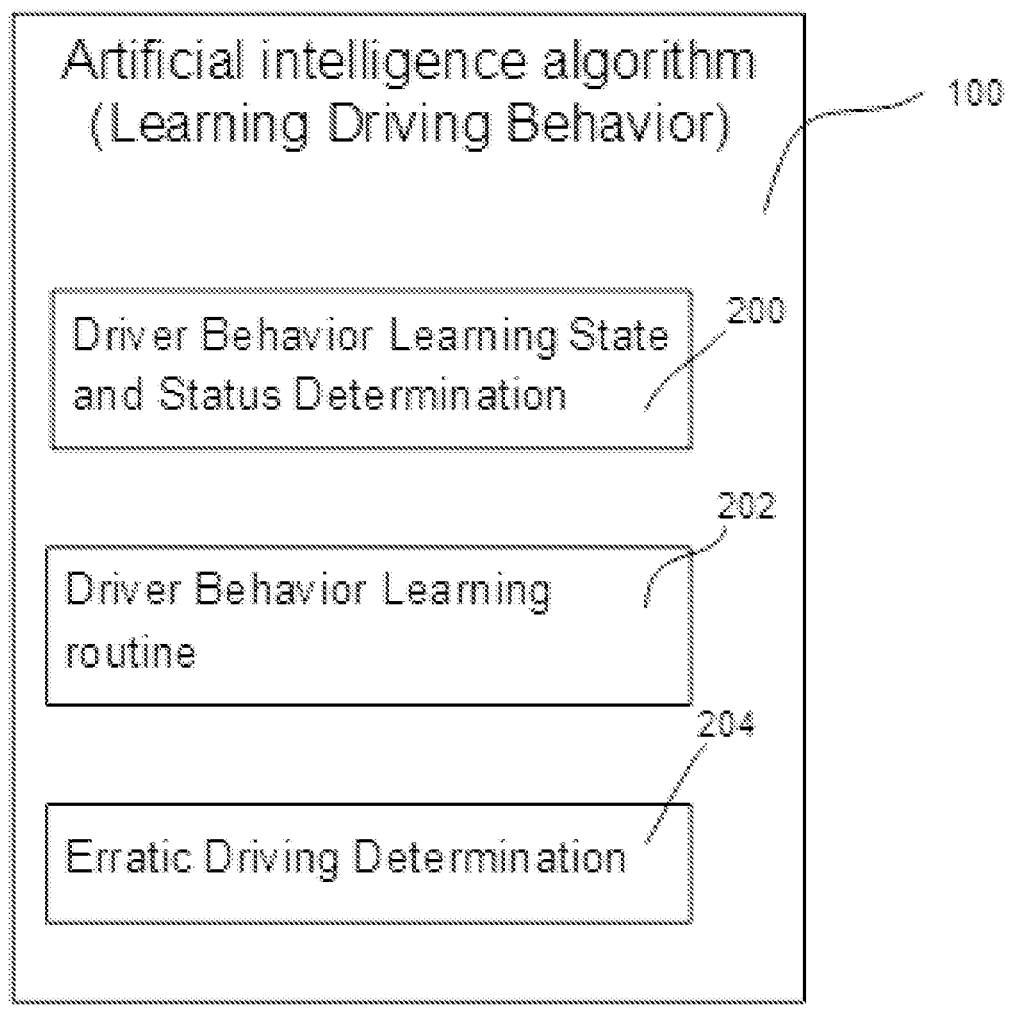
FIG. 4 is a block diagram showing the internal processing modules of the AI algorithm of the present invention.

The system learns the driving style or behavior of a particular occupant or driver of the vehicle, such as when that particular occupant or driver is driving the vehicle (such as when the control or system is operating in a non-autonomous mode and/or in a learning mode). The system with the artificial intelligence (AI) or machine learning algorithm includes three sub-functions as shown in FIG. 4: (1) Determine when driver learning shall be active and provide status that learning is occurring (see 200). This determination is based on the correctness of the data utilized for learning, such as, for example, vehicle data 112, data from the world model 116, weather information 114, vehicle occupant type 110, vehicle location 108, identification of the driver 104 and time of day 106 (see FIG. 2). Also, the status of the driver learning is either updated or learned based on data validity and learning duration associated with the desired learning type. (2) Determine if the driver is maneuvering the vehicle in an erratic manner or maneuvering the vehicle in an illegal manner (see 204 in FIG. 4), such as, for example, crossing an intersection with a red traffic light, maneuvering a right turn at an intersection without first stopping for the red traffic light are included but not limited to these. In situations like these and others that place the driver, passengers and other roadway users at risk, the driver behavior is not learned. (3) The driving behaviors learned (see 202 in FIG. 4) while the driver is maneuvering a vehicle can include but are not limited to: how close the driver follows the preceding target vehicle, how the driver accelerates the subject vehicle and the driving speed associated with the legal speed limit and traffic condition, where the driver positions the subject vehicle in the lane, how close to the limited access highway exit the driver starts to perform a lane change maneuver to a lane associated with the exit ramp, how the driver performs a lane change and/or how the driver traverses curved and straight roadways. The driving behavior may be learned when the system is operating in a semi-autonomous or non-autonomous mode, where the driver full or partial control of the vehicle and the system is not always controlling the steering or brakes or accelerator of the vehicle, or where a driver assistance system is active (such as a semi-autonomous mode where, for example, the longitudinal control is active and the driver is still controlling the steering, whereby the system may learn the driver's steering tendencies or behavior).

Figure 5:
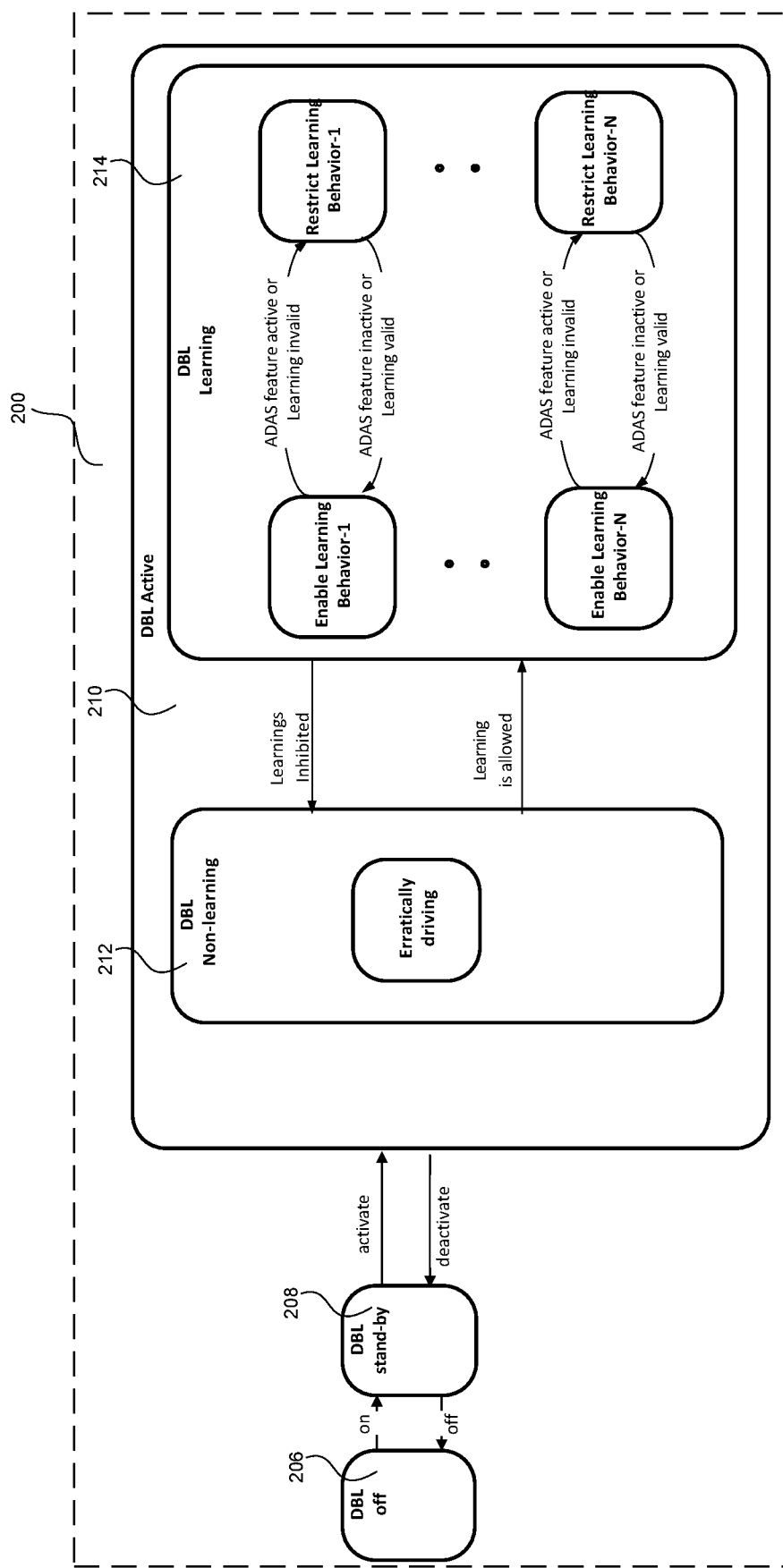
FIG. 5 is a block diagram showing the state machine of the driver behavior learning.

Driver Behavior Learning (DBL) systems shall, at a minimum, provide the functionality and state transitions shown in FIG. 5. The fundamental behavior of a DBL system is shown, for example, in FIG. 5, and includes the learning function being off 206 when the driver does not want the current driving cycle used to determine or add to the already learned driver behavior. The learning shall remain in at standby mode 208 until all the required input data is valid. Learning is possible when all data is valid and driver selected learning can occur. In this situation learning functionality shall be active 210. Learning shall be inhibited if erratic driver behavior 212 is detected. Learning for specific behaviors can occur (see 214) if specific (i.e., associated with the learning) ADAS feature(s) are inactive or the driving environment associated with the behavior is feasible. For example, the system cannot learn how close to a limited access highway exit the driver maneuvers to the exit lane if the vehicle is not on such a roadway.

For the same driver the driving signature varies with factors such as "baby on board", "location", "time of the day" and/or the like. In Machine Learning this is called "features". Different machine learning algorithms can be used. For example, the features can be clustered using an "unsupervised" algorithm to assign it to one of the pre-determined clusters (Vehicle Behavior Profiles in this case). Another example is to use a "supervised" algorithm in which the system is "trained" using the features and a label (Vehicle Behavior Profile in this case) associated with each set of these features. The system is then presented with a similar set of features and the system predicts the label. Both these systems can be online, that is, they learn over the period that a driver uses the vehicle. It improves over-time. In another example, a memory based or "one-shot" learning Machine Learning algorithm can be used. This allows the system to learn using a single or very few training features. An "Anomaly Detection" or similar algorithm can also be used to remove outliers. A typical use case would be to ignore erratic driving behavior.

For autonomous vehicles suitable for deployment with the system of the present invention, an occupant of the vehicle may, under particular circumstances, be desired or required to take over operation/control of the vehicle (when the control is operating in the autonomous mode) and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle (or had been previously functioning as the driver while the control was operating in a learning mode) when the vehicle control system hands over control to the occupant or driver or when the vehicle control system is otherwise not operating in an autonomous mode. When operating in the autonomous mode, the control controls or drives or maneuvers the vehicle without human intervention, while, when operating in the semi-autonomous mode, the occupant controls or drives or maneuvers the vehicle and the control may or may not provide some control or driving assistance (such as, for example, a steering correction for a lane keep assist system, or a braking or speed adjustment for an adaptive cruise control system or the like).

There may be various modes that the vehicle may adapt to in driving style when driving autonomously—from a slower, less aggressive driving style to more aggressive driving, and the reason for having them is that not everyone is willingly to always commute in the slower, less aggressive driving mode. However, automated driving should be always safe in all modes. The system of the present invention takes it to another level by recognizing occupants and adjusting the mode accordingly (these modes may be different from the above non-aggressive and aggressive modes). For example, the system may operate in a less aggressive driving mode responsive to determination that the driver is distracted or is using his or her hands, such as holding a cup of coffee or the like.

One characteristic mode may be the 'child present in vehicle'—mode. The child present driving behavior learning feature is a part of the driving behavior learning that takes into account the occupants and type of occupants present in the vehicle. The type of occupant or characteristic of the occupant is determined based on biometric characteristics of the occupant (e.g., size, age, etc.) and/or based on activities or other characteristics of the occupant (e.g., holding food or a beverage, etc.). For example, if there is a child present in the vehicle, the driver's driving behavior may be different compared to when there is no child present in the vehicle. When a child (or more than one child) is present in the vehicle, the driver may select a driving style that is less abrupt in braking and accelerating and in changes in positive or negative acceleration, so jerk is minimized. Additionally, the driver may take curves less fast and/or may avoid side accelerations and changes in side accelerations. There may be another different driving style when one or more child or baby is/are present and at least one is crying. The driving style may be to drive soft s-curves even when the road goes straight (if there is no danger in maneuvering the vehicle in that manner, such as when there are no other vehicles present in the lanes adjacent to the lane in which the subject vehicle is traveling).

The "baby on board" mode is one of the scenarios in which the driving behavior of the driver may be conservative and not aggressive. Aggressive driving may be characterized by frequent changing of lanes, frequent overtaking, hard braking and less time-gap or low distance to other traffic participants. Because the vehicle is learning to imitate the driver's driving style, there may be different styles on the scale of different input parameters (occupancy and condition parameters) but without judging or labeling whether the style is more or less comfortable, fuel saving, vehicle wearing, lullabying, enervating for the elderly or slower responding, less aggressive, more conservative driver or occupant.

The system may determine the occupancy of the vehicle responsive to a user input or to a vehicle interior monitoring system, which may include one or more cameras with a field of view interior the vehicle and encompassing the seats of the vehicle. The system may recognize or identify particular occupants or types of occupants or categories of occupants in determining the driving style or mode. The system may determine, for example (and such as via processing of image data captured by one or more interior monitoring cameras of the vehicle), whether an occupant is small (such as a baby or child), whether an occupant is elderly, that the occupant is consuming food or a beverage (such as by determining that the occupant is holding a cup or other object), and/or whether the occupant has a physical characteristic that is indicative of a category of occupants who may prefer or require a less aggressive driving style, whereby the system may adjust the control of the vehicle to a less aggressive driving style.

The system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336878, which are hereby incorporated herein by reference in their entireties.

When the occupant(s) in the vehicle is/are identified or classified or characterized, the system may then control the vehicle in an autonomous or semi-autonomous mode and in a manner set by the determination/classification/identification of the occupant(s) in the vehicle. When operating in the autonomous or semi-autonomous mode, the system controls vehicle movement and maneuvering responsive to multiple exterior viewing/sensing sensors and/or cameras of the vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-toinfrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:
    an interior-viewing camera disposed at a vehicle equipped with the vehicular cabin monitoring system, wherein the interior-viewing camera (i) views a driver sitting at a driver seat of the vehicle and (ii) views at least one other seat of the vehicle;
    wherein the interior-viewing camera is operable to capture image data;
    a processor disposed at the vehicle, wherein the processor is operable to process image data captured by the interior-viewing camera;
    wherein the vehicular cabin monitoring system, at least in part via processing at the processor of image data captured by the interior-viewing camera, detects an occupant present in the vehicle;
    wherein the vehicular cabin monitoring system, at least in part via processing at the processor of image data captured by the interior-viewing camera, monitors the driver sitting at the driver seat of the vehicle; and
    wherein control of the vehicle is adjusted based at least in part on (i) the monitoring of the driver and (ii) the detected occupant.

2. The vehicular cabin monitoring system of claim 1, wherein the vehicular cabin monitoring system learns driving style of the driver when the vehicle is being driven by the driver.

3. The vehicular cabin monitoring system of claim 2, wherein control of the vehicle is adjusted in accordance with a learned driving style of the driver.

4. The vehicular cabin monitoring system of claim 2, wherein, when the vehicle is being driven by the driver, the vehicular cabin monitoring system restricts learning of the driving style of the driver responsive to determination by the vehicular cabin monitoring system that the driver is at least one selected from the group consisting of (i) driving the vehicle erratically and (ii) performing an illegal driving maneuver.

5. The vehicular cabin monitoring system of claim 2, wherein, responsive to actuation of a user input by the driver of the vehicle, the vehicle is controlled in a less-aggressive driving style as compared to the learned driving style of the driver.

6. The vehicular cabin monitoring system of claim 2, wherein the vehicular cabin monitoring system restricts learning of the driving style of the driver of the vehicle responsive to a vehicular driving assist system of the vehicle being active.

7. The vehicular cabin monitoring system of claim 2, wherein the vehicular cabin monitoring system, at least in part via processing at the processor of image data captured by the interior-viewing camera, categorizes the detected occupant.

8. The vehicular cabin monitoring system of claim 7, wherein the vehicular cabin monitoring system, at least in part via processing at the processor of image data captured by the interior-viewing camera, categorizes the detected occupant to be a baby.

9. The vehicular cabin monitoring system of claim 7, wherein the vehicular cabin monitoring system, at least in part via processing at the processor of image data captured by the interior-viewing camera, categorizes the detected occupant to be a child.

10. The vehicular cabin monitoring system of claim 7, wherein the vehicular cabin monitoring system, at least in part via processing at the processor of image data captured by the interior-viewing camera, categorizes the detected occupant to be an elderly person.

11. The vehicular cabin monitoring system of claim 7, wherein, responsive to categorization of the detected occupant, the vehicle is controlled based on the characterization of the detected occupant.

12. The vehicular cabin monitoring system of claim 7, wherein, responsive to the detected occupant being categorized to be one selected from the group consisting of (i) a child and (ii) a baby, control of the vehicle is adjusted.

13. The vehicular cabin monitoring system of claim 1, wherein control of the vehicle is adjusted based at least in part on the presence in the vehicle of the detected occupant, and wherein the vehicular cabin monitoring system, at least in part via processing at the processor of image data captured by the interior-viewing camera, categorizes the detected occupant to be a baby.

14. The vehicular cabin monitoring system of claim 1, wherein control of the vehicle is adjusted based at least in part on the presence in the vehicle of the detected occupant, and wherein the vehicular cabin monitoring system, at least in part via processing at the processor of image data captured by the interior-viewing camera, categorizes the detected occupant to be a child.

15. The vehicular cabin monitoring system of claim 1, wherein control of the vehicle is adjusted based at least in part on the presence in the vehicle of the detected occupant, and wherein the vehicular cabin monitoring system, at least in part via processing at the processor of image data captured by the interior-viewing camera, categorizes the detected occupant to be an elderly person.

16. The vehicular cabin monitoring system of claim 1, wherein the processor that is operable to process image data captured by the interior-viewing camera is part of an electronic control unit (ECU) disposed at the vehicle.

17. The vehicular cabin monitoring system of claim 16, wherein image data captured by the interior-viewing camera is provided to the ECU via a data transfer link.

18. The vehicular cabin monitoring system of claim 16, wherein the ECU is incorporated into an interior rearview mirror assembly of the vehicle.

19. The vehicular cabin monitoring system of claim 1, wherein the vehicular cabin monitoring system, at least in part via processing at the processor of image data captured by the interior-viewing camera, categorizes the detected occupant.

20. The vehicular cabin monitoring system of claim 19, wherein the vehicular cabin monitoring system categorizes the detected occupant responsive to determination, at least in part via processing at the processor of image data captured by the interior-viewing camera, of a characteristic of the detected occupant.

21. The vehicular cabin monitoring system of claim 20, wherein the characteristic of the detected occupant is determined based on at least one selected from the group consisting of (i) size of the detected occupant, (ii) age of the detected occupant, (iii) a determination that the detected occupant is consuming food and (iv) a determination that the detected occupant is consuming a beverage.

22. The vehicular cabin monitoring system of claim 20, wherein the characteristic of the detected occupant is determined via a user input.

23. The vehicular cabin monitoring system of claim 1, wherein control of the vehicle is adjusted responsive to determination, at least in part via processing at the processor of image data captured by the interior-viewing camera, that the driver is distracted.

24. The vehicular cabin monitoring system of claim 23, wherein control of the vehicle is adjusted responsive to at least one selected from the group consisting of (i) a determination that the detected occupant is consuming a beverage and (ii) a determination that the detected occupant is consuming food.

25. The vehicular cabin monitoring system of claim 1, wherein the monitoring of the driver sitting at the driver seat of the vehicle comprises monitoring the driver's head.

26. The vehicular cabin monitoring system of claim 25, wherein the monitoring of the driver sitting at the driver seat of the vehicle comprises tracking position of the driver's head.

27. The vehicular cabin monitoring system of claim 25, wherein the monitoring of the driver sitting at the driver seat of the vehicle comprises tracking direction of the driver's head.

28. The vehicular cabin monitoring system of claim 1, wherein the monitoring of the driver sitting at the driver seat of the vehicle comprises tracking the driver's eyes.

29. The vehicular cabin monitoring system of claim 1, wherein the monitoring of the driver sitting at the driver seat of the vehicle comprises recognizing a gesture made by the driver.

30. The vehicular cabin monitoring system of claim 1, wherein the monitoring of the driver sitting at the driver seat of the vehicle comprises (i) tracking position and direction of the driver's head and (ii) tracking the driver's eyes.

31. The vehicular cabin monitoring system of claim 1, wherein the monitoring of the driver sitting at the driver seat of the vehicle comprises tracking the driver's eyes, and wherein the vehicular cabin monitoring system, at least in part via processing at the processor of image data captured by the interior-viewing camera, categorizes the detected occupant.

32. The vehicular cabin monitoring system of claim 1, wherein the vehicular cabin monitoring system, at least in part via processing at the processor of image data captured by the interior-viewing camera, categorizes the detected occupant based on a biometric characteristic of the detected occupant.

33. The vehicular cabin monitoring system of claim 1, wherein the vehicular cabin monitoring system, at least in part via processing at the processor of image data captured by the interior-viewing camera, categorizes the detected occupant based on activity of the detected occupant.

34. A vehicular cabin monitoring system, the vehicular cabin monitoring system comprising:
an interior-viewing camera disposed at a vehicle equipped with the vehicular cabin monitoring system, wherein the interior-viewing camera (i) views a driver sitting at a driver seat of the vehicle and (ii) views at least one other seat of the vehicle;
wherein the interior-viewing camera is operable to capture image data;
a processor disposed at the vehicle, wherein the processor is operable to process image data captured by the interior-viewing camera;
wherein the vehicular cabin monitoring system, at least in part via processing at the processor of image data captured by the interior-viewing camera, detects an occupant present in the vehicle;
wherein the vehicular cabin monitoring system, at least in part via processing at the processor of image data captured by the interior-viewing camera, monitors the driver sitting at the driver seat of the vehicle; and
wherein control of the vehicle is adjusted responsive to determination, at least in part via processing at the processor of image data captured by the interior-viewing camera, that the driver is distracted.

35. The vehicular cabin monitoring system of claim 34, wherein the vehicular cabin monitoring system learns driving style of the driver when the vehicle is being driven by the driver.

36. The vehicular cabin monitoring system of claim 34, wherein control of the vehicle is adjusted based at least in part on (i) determination that the driver is at least one selected from the group consisting of (a) driving the vehicle erratically and (b) performing an illegal driving maneuver and (ii) the detected occupant.

37. The vehicular cabin monitoring system of claim 34, wherein the vehicular cabin monitoring system, at least in part via processing at the processor of image data captured by the interior-viewing camera, categorizes the detected occupant.

38. The vehicular cabin monitoring system of claim 37, wherein the vehicular cabin monitoring system, at least in part via processing at the processor of image data captured by the interior-viewing camera, categorizes the detected occupant to be a baby.

39. The vehicular cabin monitoring system of claim 37, wherein the vehicular cabin monitoring system, at least in part via processing at the processor of image data captured by the interior-viewing camera, categorizes the detected occupant to be a child.

40. The vehicular cabin monitoring system of claim 37, wherein the vehicular cabin monitoring system, at least in part via processing at the processor of image data captured by the interior-viewing camera, categorizes the detected occupant to be an elderly person.

41. The vehicular cabin monitoring system of claim 37, wherein, responsive to categorizing the detected occupant as one selected from the group consisting of (i) a child and (ii) a baby, control of the vehicle is adjusted.

42. The vehicular cabin monitoring system of claim 37, wherein the vehicular cabin monitoring system categorizes the detected occupant responsive to determination, at least in part via processing at the processor of image data captured by the interior-viewing camera, of a characteristic of the detected occupant.

43. The vehicular cabin monitoring system of claim 42, wherein the characteristic of the detected occupant is determined based on at least one selected from the group consisting of (i) size of the detected occupant, (ii) age of the detected occupant, (iii) a determination that the detected occupant is consuming food and (iv) a determination that the detected occupant is consuming a beverage.

44. The vehicular cabin monitoring system of claim 34, wherein the processor that is operable to process image data captured by the interior-viewing camera is part of an electronic control unit (ECU) disposed at the vehicle.

45. The vehicular cabin monitoring system of claim 44, wherein image data captured by the interior-viewing camera is provided to the ECU via a data transfer link.

46. The vehicular cabin monitoring system of claim 44, wherein the ECU is incorporated into an interior rearview mirror assembly of the vehicle.

47. The vehicular cabin monitoring system of claim 34, wherein the monitoring of the driver sitting at the driver seat of the vehicle comprises monitoring the driver's head.

48. The vehicular cabin monitoring system of claim 47, wherein the monitoring of the driver sitting at the driver seat of the vehicle comprises tracking position of the driver's head.

49. The vehicular cabin monitoring system of claim 47, wherein the monitoring of the driver sitting at the driver seat of the vehicle comprises tracking direction of the driver's head.

50. The vehicular cabin monitoring system of claim 47, wherein the monitoring of the driver sitting at the driver seat of the vehicle comprises tracking the driver's eyes.

51. The vehicular cabin monitoring system of claim 34, wherein the monitoring of the driver sitting at the driver seat of the vehicle comprises recognizing a gesture made by the driver.

52. The vehicular cabin monitoring system of claim 34, wherein the monitoring of the driver sitting at the driver seat of the vehicle comprises (i) tracking position and direction of the driver's head and (ii) tracking the driver's eyes.

53. The vehicular cabin monitoring system of claim 34, wherein the monitoring of the driver sitting at the driver seat of the vehicle comprises tracking the driver's head, and wherein the vehicular cabin monitoring system, at least in part via processing at the processor of image data captured by the interior-viewing camera, categorizes the detected occupant.

54. The vehicular cabin monitoring system of claim 34, wherein the monitoring of the driver sitting at the driver seat of the vehicle comprises tracking the driver's eyes, and wherein the vehicular cabin monitoring system, at least in part via processing at the processor of image data captured by the interior-viewing camera, categorizes the detected occupant.

55. The vehicular cabin monitoring system of claim 54, wherein the vehicular cabin monitoring system, at least in part via processing at the processor of image data captured by the interior-viewing camera, categorizes the detected occupant based on a biometric characteristic of the detected occupant.

56. The vehicular cabin monitoring system of claim 34, wherein the vehicular cabin monitoring system, at least in part via processing at the processor of image data captured by the interior-viewing camera, categorizes the detected occupant based on activity of the detected occupant.

57. A vehicular cabin monitoring system, the vehicular cabin monitoring system comprising:
an interior-viewing camera disposed at a vehicle equipped with the vehicular cabin monitoring system, wherein the interior-viewing camera (i) views a driver sitting at a driver seat of the vehicle and (ii) views at least one other seat of the vehicle;
wherein the interior-viewing camera is operable to capture image data;
a processor disposed at the vehicle, wherein the processor is operable to process image data captured by the interior-viewing camera;
wherein the vehicular cabin monitoring system, at least in part via processing at the processor of image data captured by the interior-viewing camera, detects an occupant present in the vehicle;
wherein the detected occupant comprises one selected from the group consisting of (i) a child and (ii) a baby;
wherein the vehicular cabin monitoring system, at least in part via processing at the processor of image data captured by the interior-viewing camera, monitors the driver sitting at the driver seat of the vehicle; and
wherein control of the vehicle is adjusted based at least in part on the presence in the vehicle of the detected occupant.

58. The vehicular cabin monitoring system of claim 57, wherein the vehicular cabin monitoring system learns driving style of the driver when the vehicle is being driven by the driver.

59. The vehicular cabin monitoring system of claim 58, wherein control of the vehicle is adjusted in accordance with a learned driving style of the driver.

60. The vehicular cabin monitoring system of claim 57, wherein control of the vehicle is adjusted responsive to determination, at least in part via processing at the processor of image data captured by the interior-viewing camera, that the driver is distracted.

61. The vehicular cabin monitoring system of claim 57, wherein the processor that is operable to process image data captured by the interior-viewing camera is part of an electronic control unit (ECU) disposed at the vehicle.

62. The vehicular cabin monitoring system of claim 61, wherein image data captured by the interior-viewing camera is provided to the ECU via a data transfer link.

63. The vehicular cabin monitoring system of claim 61, wherein the ECU is incorporated into an interior rearview mirror assembly of the vehicle.

64. The vehicular cabin monitoring system of claim 57, wherein the vehicular cabin monitoring system determines that the detected occupant comprises one selected from the group consisting of (i) a child and (ii) a baby responsive to determination, at least in part via processing at the processor of image data captured by the interior-viewing camera, of a characteristic of the detected occupant.

65. The vehicular cabin monitoring system of claim 64, wherein the characteristic of the detected occupant is determined based on at least one selected from the group consisting of (i) size of the detected occupant and (ii) age of the detected occupant.

66. The vehicular cabin monitoring system of claim 57, wherein the monitoring of the driver sitting at the driver seat of the vehicle comprises monitoring the driver's head.

67. The vehicular cabin monitoring system of claim 66, wherein the monitoring of the driver sitting at the driver seat of the vehicle comprises tracking position of the driver's head.

68. The vehicular cabin monitoring system of claim 66, wherein the monitoring of the driver sitting at the driver seat of the vehicle comprises tracking direction of the driver's head.

69. The vehicular cabin monitoring system of claim 57, wherein the monitoring of the driver sitting at the driver seat of the vehicle comprises tracking the driver's eyes.

70. The vehicular cabin monitoring system of claim 57, wherein the monitoring of the driver sitting at the driver seat of the vehicle comprises recognizing a gesture made by the driver.

71. The vehicular cabin monitoring system of claim 57, wherein the monitoring of the driver sitting at the driver seat of the vehicle comprises (i) tracking position and direction of the driver's head and (ii) tracking the driver's eyes.

72. The vehicular cabin monitoring system of claim 57, wherein the monitoring of the driver sitting at the driver seat of the vehicle comprises tracking the driver's head, and wherein the vehicular cabin monitoring system, at least in part via processing at the processor of image data captured by the interior-viewing camera, categorizes the detected occupant.

73. The vehicular cabin monitoring system of claim 57, wherein the monitoring of the driver sitting at the driver seat of the vehicle comprises tracking the driver's eyes, and wherein the vehicular cabin monitoring system, at least in part via processing at the processor of image data captured by the interior-viewing camera, categorizes the detected occupant.

74. The vehicular cabin monitoring system of claim 57, wherein the vehicular cabin monitoring system, at least in part via processing at the processor of image data captured by the interior-viewing camera, categorizes the detected occupant based on a biometric characteristic of the detected occupant.

75. The vehicular cabin monitoring system of claim 57, wherein the vehicular cabin monitoring system, at least in part via processing at the processor of image data captured by the interior-viewing camera, categorizes the detected occupant based on activity of the detected occupant.

76. A vehicular cabin monitoring system, the vehicular cabin monitoring system comprising:
an interior-viewing camera disposed at a vehicle equipped with the vehicular cabin monitoring system, wherein the interior-viewing camera (i) views a driver sitting at a driver seat of the vehicle and (ii) views at least one other seat of the vehicle;
wherein the interior-viewing camera is operable to capture image data;
a processor disposed at the vehicle, wherein the processor is operable to process image data captured by the interior-viewing camera;
wherein the vehicular cabin monitoring system, at least in part via processing at the processor of image data captured by the interior-viewing camera, detects an occupant present in the vehicle;
wherein the vehicular cabin monitoring system, at least in part via processing at the processor of image data captured by the interior-viewing camera, monitors the driver sitting at the driver seat of the vehicle;
wherein the monitoring of the driver sitting at the driver seat of the vehicle comprises tracking the driver's eyes;
wherein the processor that is operable to process image data captured by the interior-viewing camera is part of an electronic control unit (ECU) disposed at the vehicle; and
wherein the ECU is incorporated into an interior rearview mirror assembly of the vehicle.

77. The vehicular cabin monitoring system of claim 76, wherein control of the vehicle is adjusted responsive to determination, at least in part via processing at the processor of image data captured by the interior-viewing camera, that the driver is distracted.

78. The vehicular cabin monitoring system of claim 76, wherein the vehicular cabin monitoring system learns driving style of the driver when the vehicle is being driven by the driver, and wherein control of the vehicle is adjusted in accordance with a learned driving style of the driver.

79. The vehicular cabin monitoring system of claim 76, wherein image data captured by the interior-viewing camera is provided to the ECU via a data transfer link.

80. The vehicular cabin monitoring system of claim 76, wherein the vehicular cabin monitoring system determines that the detected occupant comprises one selected from the group consisting of (i) a child and (ii) a baby responsive to determination, at least in part via processing at the processor of image data captured by the interior-viewing camera, of a characteristic of the detected occupant, and wherein the characteristic of the detected occupant is determined based on at least one selected from the group consisting of (i) size of the detected occupant and (ii) age of the detected occupant.

81. The vehicular cabin monitoring system of claim 76, wherein the vehicular cabin monitoring system, at least in part via processing at the processor of image data captured by the interior-viewing camera, categorizes the detected occupant based on a biometric characteristic of the detected occupant.

82. The vehicular cabin monitoring system of claim 76, wherein the vehicular cabin monitoring system, at least in part via processing at the processor of image data captured by the interior-viewing camera, categorizes the detected occupant based on activity of the detected occupant.

* * * * *